United States Patent
Katz et al.

(10) Patent No.: US 11,551,111 B2
(45) Date of Patent: Jan. 10, 2023

(54) DETECTION AND USE OF ANOMALIES IN AN INDUSTRIAL ENVIRONMENT

(71) Applicant: PTC Inc., Needham, MA (US)

(72) Inventors: Bruce F. Katz, Philadelphia, PA (US); Max Peysakhov, Langhorne, PA (US)

(73) Assignee: PTC INC., Needham, MA (US)

( * ) Notice: Subject to any disclaimer, the term of this patent is extended or adjusted under 35 U.S.C. 154(b) by 936 days.

(21) Appl. No.: 16/389,074

(22) Filed: Apr. 19, 2019

(65) Prior Publication Data

US 2019/0325328 A1 Oct. 24, 2019

Related U.S. Application Data

(60) Provisional application No. 62/659,943, filed on Apr. 19, 2018.

(51) Int. Cl.
*G06N 5/04* (2006.01)
*G06F 17/14* (2006.01)
(Continued)

(52) U.S. Cl.
CPC .............. *G06N 5/04* (2013.01); *G01D 5/00* (2013.01); *G06F 17/14* (2013.01); *G06N 20/00* (2019.01); *G06F 17/142* (2013.01)

(58) Field of Classification Search
CPC ... G06F 17/14; G06F 17/142; G06K 9/00536; G06K 9/00516; G06K 9/00523;
(Continued)

(56) References Cited

U.S. PATENT DOCUMENTS

| 11,061,395 B2 * | 7/2021 | Maurer | H04L 63/1425 |
| 2017/0228660 A1 * | 8/2017 | Kutzkov | G06N 5/003 |
| 2019/0138939 A1 * | 5/2019 | Devaraju | G05B 23/0289 |

FOREIGN PATENT DOCUMENTS

| EP | 3144918 A1 * | 3/2017 | ......... G06K 9/00825 |
| EP | 3428746 B1 * | 6/2021 | ............. B25J 9/163 |

OTHER PUBLICATIONS

H. H. W. J. Bosman, G. Iacca, H. J. Wörtche and A. Liotta, "Online Fusion of Incremental Learning for Wireless Sensor Networks," 2014 IEEE International Conference on Data Mining Workshop, 2014, pp. 525-532, doi: 10.1109/ICDMW.2014.79. (Year: 2014).*

(Continued)

*Primary Examiner* — Joseph P Hirl
*Assistant Examiner* — Thomas A Gyorfi
(74) *Attorney, Agent, or Firm* — Troutman Pepper Hamilton Sanders LLP

(57) ABSTRACT

A method for predicting variables of interest related to a system includes collecting one or more sensor streams over a time period from sensors in the system and generating one or more anomaly streams for the time period based on the sensor streams. Values for variables of interest for the time period are determined based on the sensor streams and the anomaly streams. Next, a time-series predictive algorithm is applied to the (i) the sensor streams, (ii) the anomaly streams, and (iii) the values for the variables of interest to generate a model for predicting new values for the variables of interest. The model may then be used to predict values for the variables of interest at a time within a new time period based on one or more new sensor streams.

20 Claims, 10 Drawing Sheets

(51) Int. Cl.
*G06N 20/00* (2019.01)
*G01D 5/00* (2006.01)

(58) Field of Classification Search
CPC .......... G06K 9/627; G06N 5/04; G06N 20/00; G06N 3/0445; G06N 3/08; G06N 7/005; G01D 5/00; G01D 1/18; G01D 3/08; G01D 21/00
See application file for complete search history.

(56) References Cited

OTHER PUBLICATIONS

Dominique Shipmon, Jason Gurevitch, Paolo Piselli, Steve Edwards. "Time Series Anomaly Detection: Detection of Anomalous Drops with Limited Features and Sparse Examples in Noisy Highly Periodic Data" pp. 1-9 https://doi.org/10.48550/arXiv.1708.03665 (Year: 2017).*

* cited by examiner

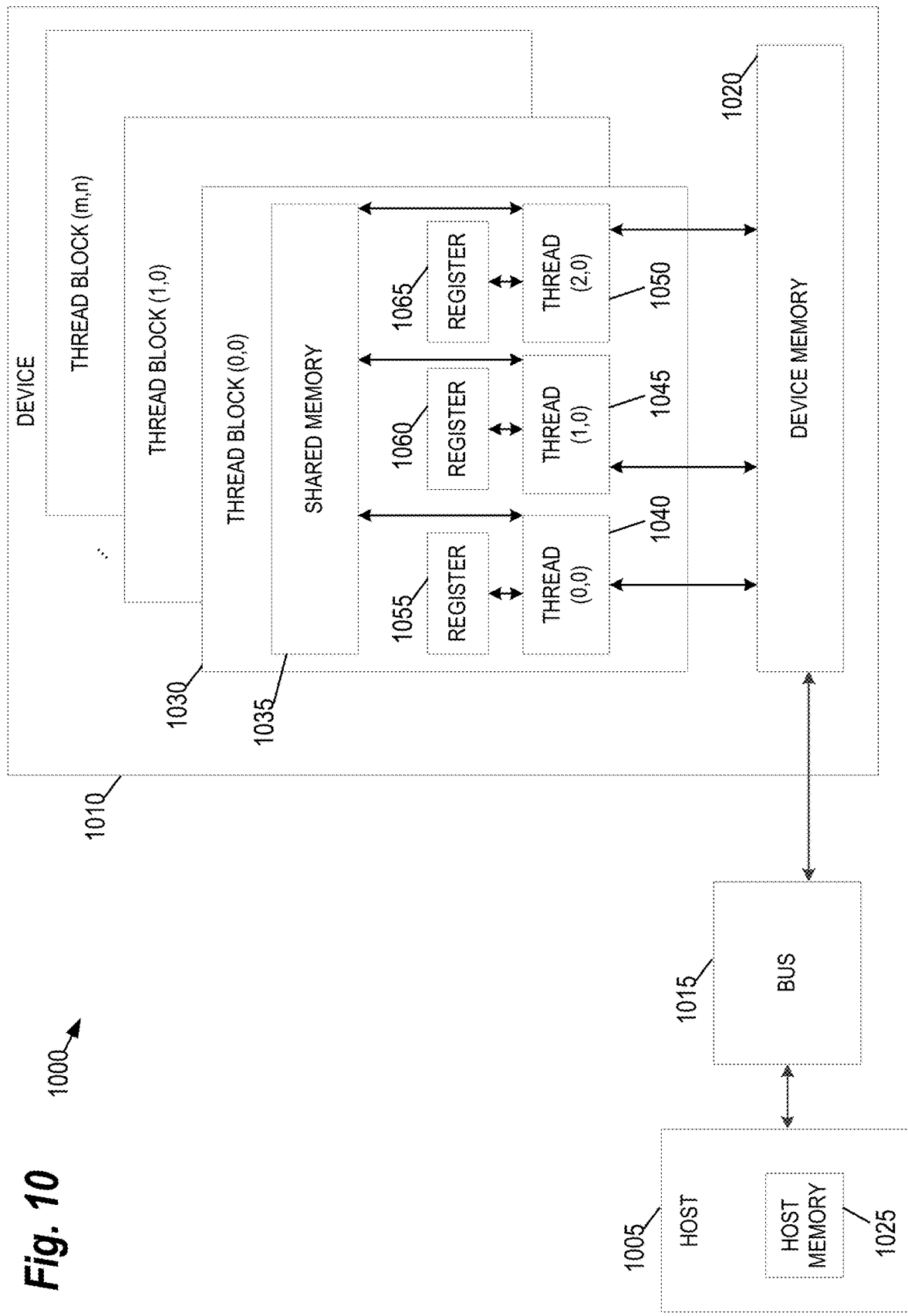

DETECTION AND USE OF ANOMALIES IN AN INDUSTRIAL ENVIRONMENT

CROSS REFERENCE TO RELATED APPLICATIONS

This application claims the benefit of U.S. Provisional Patent Application Ser. No. 62/659,943, filed on Apr. 19, 2018, entitled "Detection and Use of Anomalies in an Industrial Environment," the entire contents of which are incorporated by reference herein.

TECHNICAL FIELD

The present disclosure relates generally to methods, systems, and apparatuses, for detecting anomalies in one or more device sensors in an industrial environment or elsewhere.

BACKGROUND

In complex systems, one or more sensors are typically utilized to detect anomalies in the system's operations. In its most general form, an anomaly indicates that something unusual or out of the ordinary is occurring within the system. A simple form of such occurrence will take place any time there is a deviation in a sensor value from the norm. For example, assume that the mean operating temperature of an engine under ordinary conditions is 174 degrees Centigrade, with a standard deviation of 12 degrees. If the current temperature is 243 degrees Centigrade, it can be assumed that this indicates an anomalous condition. Anomalies of this sort within a single sensor are referred to herein as "outlier anomalies."

Anomalies may be also defined with respect to expectation. For example, although the mean temperature of the engine is 174 degrees over all normal operating conditions, when placed in a hot desert environment, it may operate at 211 degrees. If a temperature of 214 degrees is recorded, it may be an outlier with respect to the mean, but not necessarily with respect to these particular operating conditions. Anomalies of this sort can be detected by a training a model to predict values under various conditions, including the past values of the sensor itself, and noting the deviation between predicted and actual values of the sensor. Such anomalies, when they occur, are referred to herein as "predictive anomalies."

Anomalies may be also characterized by a small but steady drift over time from standard operating conditions. In these cases, the deviation from either expectation or from the mean over a standard time period prior to management may be small. However, the cumulative deviation over time in a given direction may be indicative or causal with respect to other problems or dependent factors, and thus these anomalies should be treated like other more radical departures from expectation.

In some cases, anomalies may be dependent upon the operating mode of the device. These will be difficult to determine, because these modes may be characterized by an entirely different set of statistical and/or predictive characteristics.

Conventional system monitoring systems are designed to detect one or more of the anomalies discussed above. However, an anomaly of any form, in and of itself, may have little informational content. Consider the case of the engine operating at an anomalous 243 degrees for one hour. Depending on the design, the prior history of the engine, and a host of other variables this may or may not be harmful. In addition, without further knowledge, this may or not be indicative of decrease in operating efficiency or, under some circumstances, it may increase efficiency. In short, in many (if not most) cases, there is a missing element that takes the information generated by an anomaly detector and converts it into something of value.

SUMMARY

Embodiments of the present invention address and overcome one or more of the above shortcomings and drawbacks by providing methods, systems, and apparatuses related to the detection and use of anomalies in sensor data within a device or plurality of such in an industrial environment. In general the technology described herein may be applied anomaly detection in any device system, include systems that include one or more Internet of Things (IoT) devices. For example, embodiments of the present invention may be used to detect anomalies within a working engine, report those anomalies through an interface to a human consumer of that information, and consume that information for the purposes of making predictions regarding that engine (e.g., to time to failure, probability of failure over a given period, efficiency of that engine, etc.).

An anomaly within a stream of successive values generated by a sensor indicates that something out of the ordinary is present in those values. This departure from normalcy may be statistical in the sense that it is indicative of a significant deviation from the mean value, but it also may be with respect to expectation, that is, the difference between the predicted value and the actual value. Other possibilities include significant drift in the value of a sensor.

Anomalies of any sort are minimally informative in the sense that they indicate a departure from ordinary operating conditions, but provide true actionable intelligence only when coupled with a prediction regarding a variable of interest. This can be done by forming an anomaly stream analogous to the original raw value stream of the sensor, although with a possibly larger time resolution. These can be appended to the stream of teacher-provided values regarding the variable of interest, and the original raw value streams, to form a table from which a model can be generated.

In some cases, a human expert can examine this table and construct a set of rules deriving the values of the variable of interest, but in most cases a time-series inductive model will produce greater predictive accuracy with respect to this task. This model may be improved, for example, by filtering out uninformative streams, by looking back the correct amount in each stream, or by other feature engineering pre-processing steps on the table such as taking a running average of the anomaly stream.

For example, according to some embodiments, a method for predicting variables of interest related to a system includes collecting one or more sensor streams over a time period from sensors in the system and generating one or more anomaly streams for the time period based on the sensor streams. Values for variables of interest for the time period are determined based on the sensor streams and the anomaly streams. Next, a time-series predictive algorithm is applied to the (i) the sensor streams, (ii) the anomaly streams, and (iii) the values for the variables of interest to generate a model for predicting new values for the variables of interest. The model may then be used to predict values for the variables of interest at a time within a new time period based on one or more new sensor streams.

Global anomalies within a device may be formed by combining the statistical properties of individual anomalies. This process may be extended to a collection of devices, such as those on a factory floor, to generate a single anomaly measure for the entire factory. These global anomalies, in conjunction with the original data streams and the anomaly streams derived therefrom, may then be used to construct a data table that can be used to predict collective variables of interest, such as those across an entire factory including downtime, throughput, operating efficiency, and the like.

Additional features and advantages of the invention will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there are shown in the drawing exemplary embodiments that are presently preferred, it being understood, however, that the invention is not limited to the specific instrumentalities disclosed. Included in the drawings are the following Figures:

FIG. 10 provides an example of a parallel processing platform that may be utilized to implement the machine learning models and other aspects of the various sensor processing methods discussed herein.

DETAILED DESCRIPTION

The following disclosure describes the present invention according to several embodiments directed at methods, systems, and apparatuses related to detection and use of anomalies in sensor data within a device or plurality of such in an industrial environment. More specifically, the technology described herein may be applied to create anomaly detectors within a sensor on a device and the use of the resultant anomaly streams to aid in the further construction of supervised learning models. These embodiments are then generalized to a plurality of sensors within a device and a plurality of devices, each with a plurality of sensors, in a device ecosystem such as a factory floor.

As noted above, conventional anomaly detection systems operate with a limited amount of informational content about the environmental conditions causing an anomaly. The techniques described herein derive this missing information from one or more dependent variables of interest that can be tied back to the stream of generated anomalies via a supervised learning algorithm. In other words, the anomaly stream alone or in consort with the raw sensor data is predictive of another variable of interest, such as failure, efficiency or the like. In these cases, the anomaly detector can provide information not only about unusual events (that may or may not be intrinsically informative), but also other events that are, by definition, informative and may result in actionable intelligence.

A number of embodiments of this scenario are disclosed herein, including the construction of predictive models from both outlier and/or predictive anomaly stream in a given sensor operating alone or in consort with the original sensor data. Other more complex embodiments are also discussed that take a plurality of such streams to improve the predictive power of the model, and also those than take a plurality of devices with a plurality of detectors to make predictions in an industrial environment.

The problem of creating a detector for an outlier anomaly using a semi-supervised method is first considered. An outlier anomaly in this context is a sensor value or set of sensor values that deviate from the mean. A semi-supervised method is one in which the system is told not the degree of anomaly per unit time, but rather a time period can be characterized as "normal." Thus, this period can be used as a reference to determine departures from normality.

Figure 1:
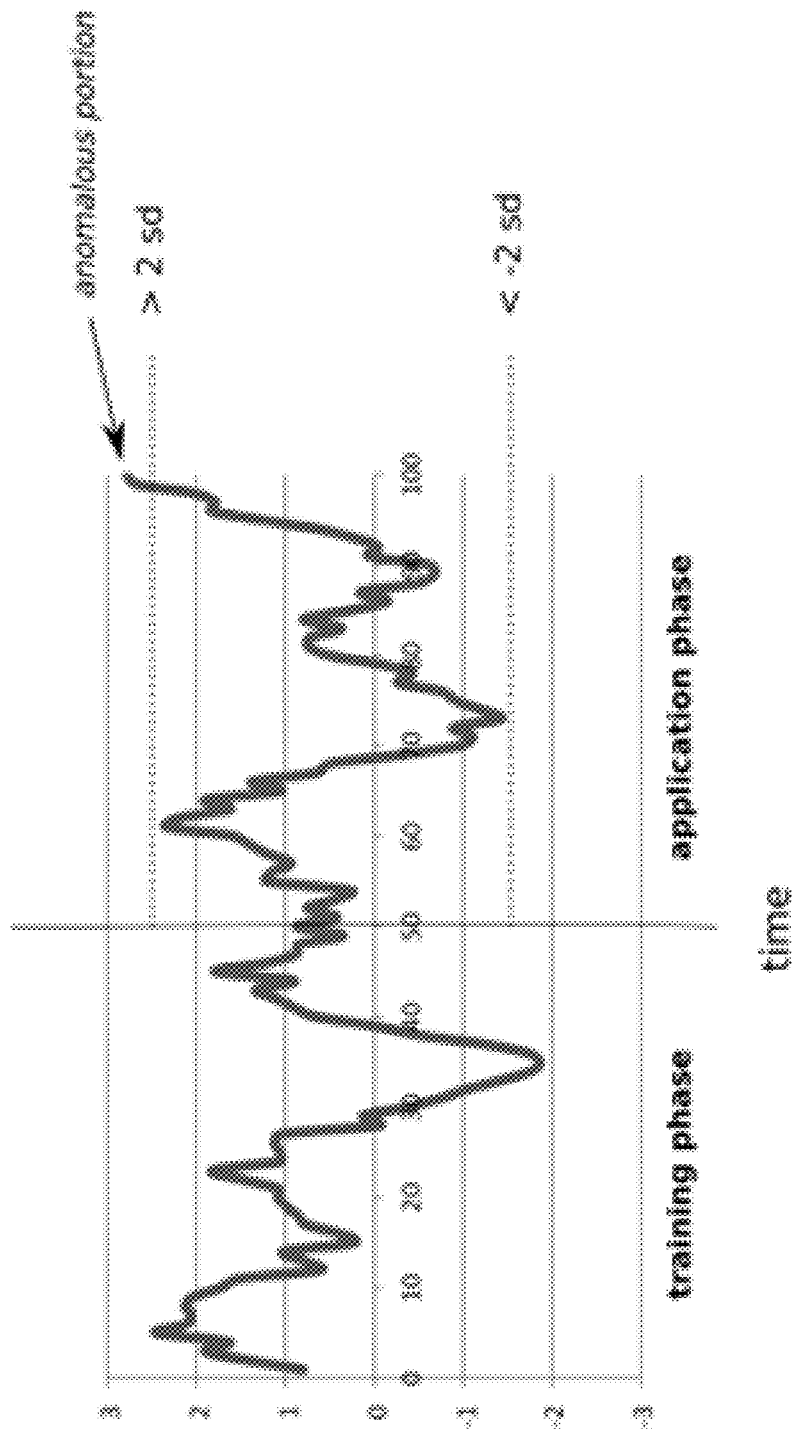
FIG. 1 shows the formation of an outlier anomaly, according to some embodiments.

FIG. 1 shows an example of generating an outlier anomaly by taking the mean and standard deviation during the training phase, and thresholding the signal thereafter by a constant of standard deviations above the mean (in this case, 2 standard deviations). In this example, the training phase (shown on the right hand side of FIG. 1) determines the normal operating statistics of this sensor, including mean and standard deviation values. This is then applied thereafter in in the application phase (shown on the left hand side of FIG. 1) in order to determine deviations from the expected mean. In this example, the mean signal value during the training phase is approximately 0.5, with a standard deviation of approximately 1.0. The threshold for departure from normality is set to ±2 standard deviations. Thus, a signal after the training phase is considered anomalous if it is above 2.5, or below 1.5. The example of FIG. 1 shows an anomalous portion of the signal above 2.5 at the end of the graph.

Figure 2:
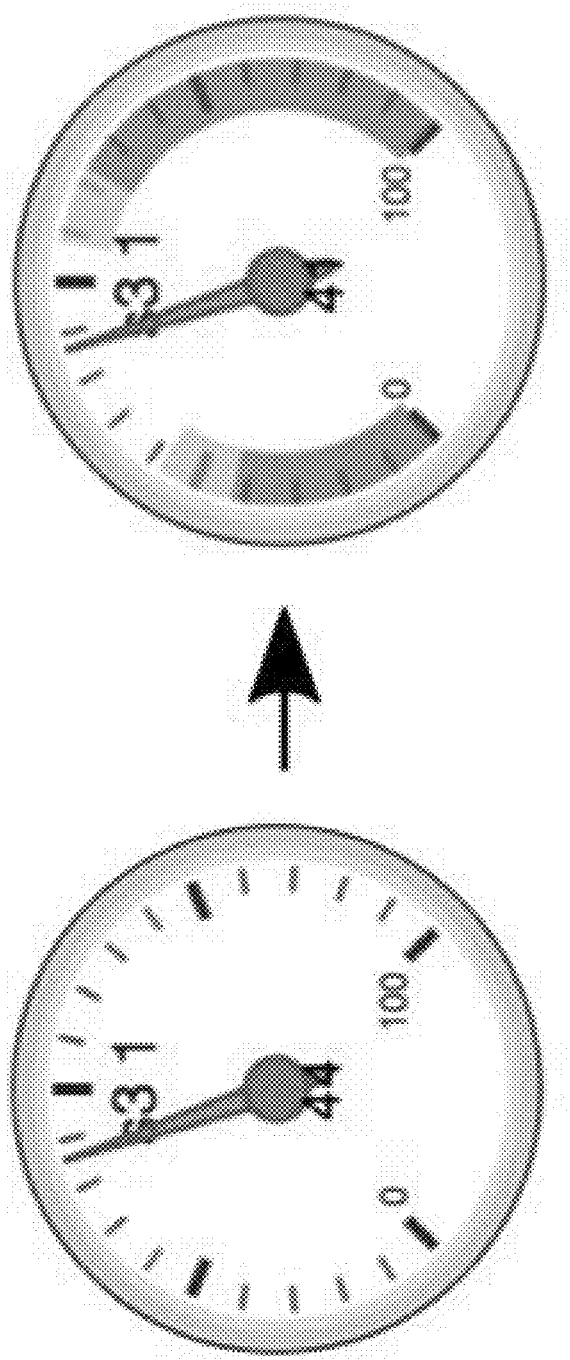
FIG. 2 illustrates a projection of outlier thresholds onto a sensor gauge, as may be utilized in some embodiments.

FIG. 2 illustrates a projection of outlier thresholds onto animated visual display of the sensor, as may be utilized in some embodiments. The left of FIG. 2 shows such a display prior to the calculation of the anomaly bounds. The right of FIG. 2 shows these bounds projected onto the sensor, with the light shading indicating greater than 3 standard deviations but less than 4 standard deviations from the mean (in this case, approximately a value of 40), below and above, and the dark shading indicating a value greater than 4 standard deviations from the mean, below and above. In this manner, an outlier anomaly can immediately be seen if the displayed sensor shows the continuous running value of this sensor.

The problem of creating a detector for a predictive anomaly is now considered. A predictive anomaly in this context is a sensor value or set of sensor values that deviate from the expectation, where that expectation is defined with respect to any prior event, including events within the sensor itself, other sensors, or other background conditions. In one embodiment, these events are restricted to only prior values of the sensor in question.

Figure 3:
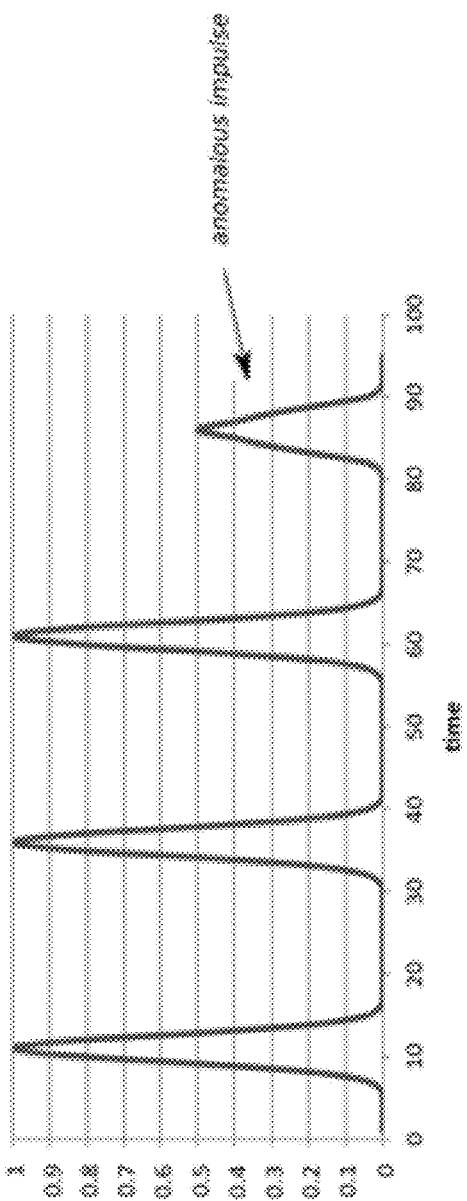
FIG. 3 shows an anomalous impulse in a data stream, as may be utilized in some embodiments.

FIG. 3 illustrates pulse sequence depicting an anomaly. More specifically, the fourth pulse is anomalous because it does not conform to the prior 3 in that it is half the height of these. Note in particular that the anomalous pulse does not contain values that deviate from the mean in a statistical sense from the prior three pulses; the mean for these is approximately 0.15, with a standard deviation of approximately 0.25. Thus the peak of this pulse at 0.5 is less than 2 standard deviations from the mean. Furthermore, the peak of the initial 3 pulses does deviate in a significant way from the mean. Taken together, these examples illustrate the counterintuitive notion that an outlier anomaly is neither a necessary nor sufficient condition for a predictive anomaly. Accordingly, a different mechanism must be used to produce predictive anomalies than that used for outlier anomalies.

A semi-supervised learning algorithm may be used to detect predictive anomalies in the sense that an initial time period is assumed to be within the normal scope of operation for the sensor in question. The purpose of this training period is to produce a predictive time-series model capable of predicting the next value in the sensor stream, at the appropriate level of temporal resolution. Anomalies are considered to occur when that prediction differs in a significant manner from the actual value. For example, in FIG. 3, based on the prior 3 pulses the peak for the last pulse would be expected to be 1.0; instead it is 0.5; this differs considerably from expectation, and thus is labeled an anomaly in the predictive sense.

A number of algorithms may be used to form a predictive time-series model including, but not limited to, autoregressive integrated moving average (ARIMA) algorithms that deconstruct the signal on the basis of either Fourier transforms within fixed windows or wavelet transform and predict on this basis, algorithms that take a fixed window in the past, apply transforms such as derivatives and the like to the data in this window, and then apply a standard machine learning algorithm such as neural networks or decision trees, and the LSTM deep learning model.

In some embodiments, the algorithms used to predict a new sensor value from prior values can draw on other sensor information to produce more accurate results. For example, in the simplified table below, the goal is to predict the value of the target sensor at time t; as an illustrative example, let us say t=5. Then the values $t_1$ to $t_4$ can be used to predict $t_5$, but other values $s_{ij}$ may also be informative, where i is the sensor number and j is the time, and thus lead to a more accurate prediction of $t_5$ in this case and $t_j$ in general.

|  | time | | | | |
|---|---|---|---|---|---|
|  | 1 | 2 | 3 | 4 | 5 |
| sensor 1 | $s_{11}$ | $s_{12}$ | $s_{13}$ | $s_{14}$ | $s_{15}$ |
| sensor2 | $s_{21}$ | $s_{22}$ | $s_{23}$ | $s_{24}$ | $s_{25}$ |
| sensor 3 | $s_{31}$ | $s_{32}$ | $s_{33}$ | $s_{34}$ | $s_{35}$ |
| target sensor | $t_1$ | $t_2$ | $t_3$ | $t_4$ | $t_5$ |

In some embodiments, other non-sensor derived information may be used to predict a target sensor value. For example, the table below has been augmented by the day of the week (constant in this case, but varying over a large data set), and an indication as to whether it is raining or not.

|  | time | | | | |
|---|---|---|---|---|---|
|  | 1 | 2 | 3 | 4 | 5 |
| sensor 1 | $s_{11}$ | $s_{12}$ | $s_{13}$ | $s_{14}$ | $s_{15}$ |
| sensor2 | $s_{21}$ | $s_{22}$ | $s_{23}$ | $s_{24}$ | $s_{25}$ |
| sensor 3 | $s_{31}$ | $s_{32}$ | $s_{33}$ | $s_{34}$ | $s_{35}$ |
| day of week | Tue | Tue | Tue | Tue | Tue |
| rain | yes | yes | no | no | no |
| target sensor | $t_1$ | $t_2$ | $t_3$ | $t_4$ | $t_5$ |

It is important to note that the predictive algorithm as well as any information that that algorithm draws upon is only important to the extent that certain configurations of algorithms and background information may be more accurate under certain circumstances. Once this model is in place, regardless of the algorithm used to produce it, a number of embodiments may then be used to identify anomalies in newly generated sensor data. In the simplest such embodiment, at each discrete time step, the actual value of the target sensor is compared to the actual sensor. Statistics gathered during the training phase provide the mean difference between predicted vs. actual values (PVAs), and the standard deviation thereof. A predictive anomaly is then assumed to occur when the number of standard deviations of the current PVA exceeds a predetermined threshold.

One difficulty with this method for computing deviation from expectation is that it implicitly assumes a normal or Gaussian distribution of data; this may or may not be the case. In another, non-parametric embodiment, the Kolmogorov Smirnov (KS) test may be used to calculate the probability that the distribution of the PVAs deviates from expectation. The KS test takes as inputs two parameters, each of which is a distribution. For the current purpose, the first such parameter will be the distribution of PVAs obtained during the training phase. The second such parameter will be the PVAs over a sampling period within the current sensor stream. The KS test will determine if these 2 samples are statistically significant, and provide a probability that they are drawn from different reference populations. If this probability exceeds a predetermined threshold, then it is assumed that the subpopulation of PVAs in the current sensor stream is anomalous.

Both outlier anomalies and predictive anomalies rely on a training phase; this phase determines a period of relative normalcy against which future events are judged. In the simplest embodiment, an expert in the field may determine which portion of the signal is appropriate for this phase. For example, an expert in heart disease may specify that a portion of an electrocardiogram is typical, and significant deviation from this is indicative of either a long-term problem or at the very least a short-term glitch in the operation of the heart. In the industrial environment, this may be more difficult to do, as there may be devices for which typical behavior is ill understood. In these cases, an estimate of the time needed for statistical extraction in the case of outlier and model training and statistical extraction in the case of predictive anomalies may be carried out as follows. First the signal is subjected to a Fourier transform, which reveals the significant components in the signal in the frequency domain. Of these components with a value above a given threshold, choose the one with the lowest frequency. This will be indicative, by construction, of the slow-moving trends in the signal. Then take a safe multiple of the wavelength associated with that frequency, and use that as the training period.

As a simple example of this embodiment, consider a vibration sensor on a machine on the factory floor. Assume that this machine carries out a series of stereotypical actions in sequence, and then returns to the beginning of the sequence. The vibration pattern will be approximately the same over the course of these actions, and Fourier analysis should thus reveal that the length of the longest cycle is the length of the sequence itself. If enough such sequences are trained on, small deviations with the vibration patterns will be averaged out, and a good predictive model should be able to be formed. Naturally this assumes that a human expert ensures at the very least that during this training phase, no anomalous behavior occurs; however, the expert does not need to specify the length of training.

Figure 4:
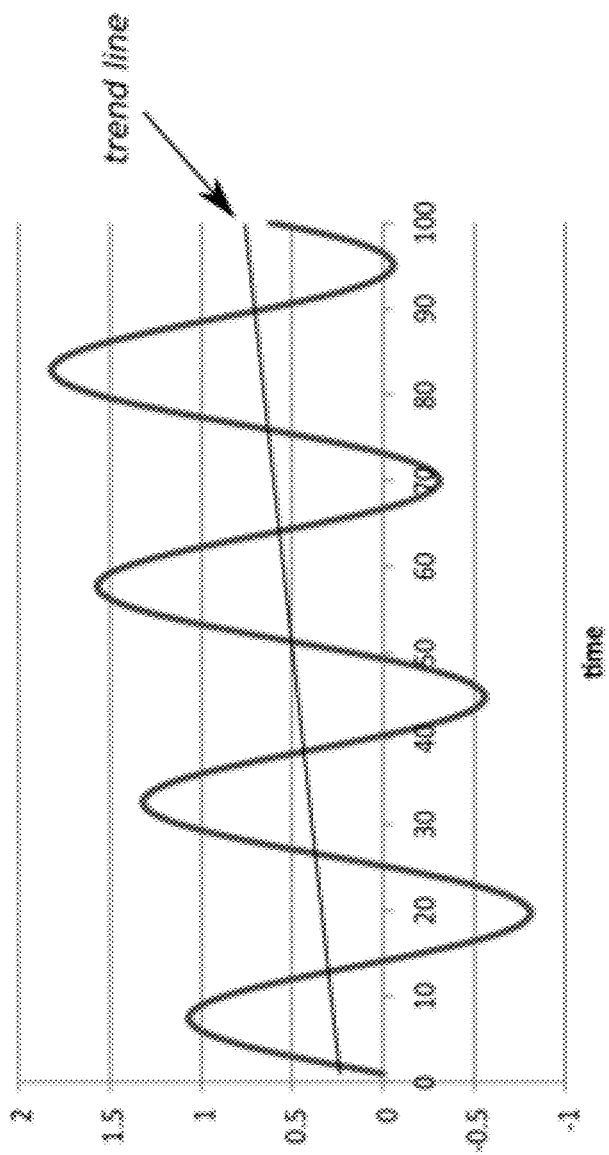
FIG. 4 illustrates a upward moving trend for a streaming signal, as may be utilized in some embodiments.

In some embodiments, the goal is not to determine whether an anomaly is present per se but whether there is drift in the data away from normalcy. Depending on the size of the drift, may or not be anomalous either in the outlier or predictive sense. Consider the situation in FIG. 4 for example. Here the mean is approximately 0.5, and the standard deviation is approximately 0.71, so that all data points are within 2 standard deviations of the mean. Moreover, because the sine wave is only slowly moving upward, all differences between predicted and actual values will be small. Thus, the data is not anomalous in either of the previous senses. However, there is a definite small upward trend, and in fact, if a trend line is drawn, one can see that the slope of this line is positive and significantly different than 0.0. Thus, the slope of this line, as revealed by least squares regression, may be of significance for predicted failure. In some embodiments, the slope of this line is continuously computed over a variable lookback window, the optimal size of which may be determined by filtering techniques generally known in the art. In another embodiment, other non-linear trend lines are drawn, such as a second order polynomial, or logarithmic curve. The parameters of these non-linear trends then become input to a system which is attempting to predict a supervised signal.

Figure 5:
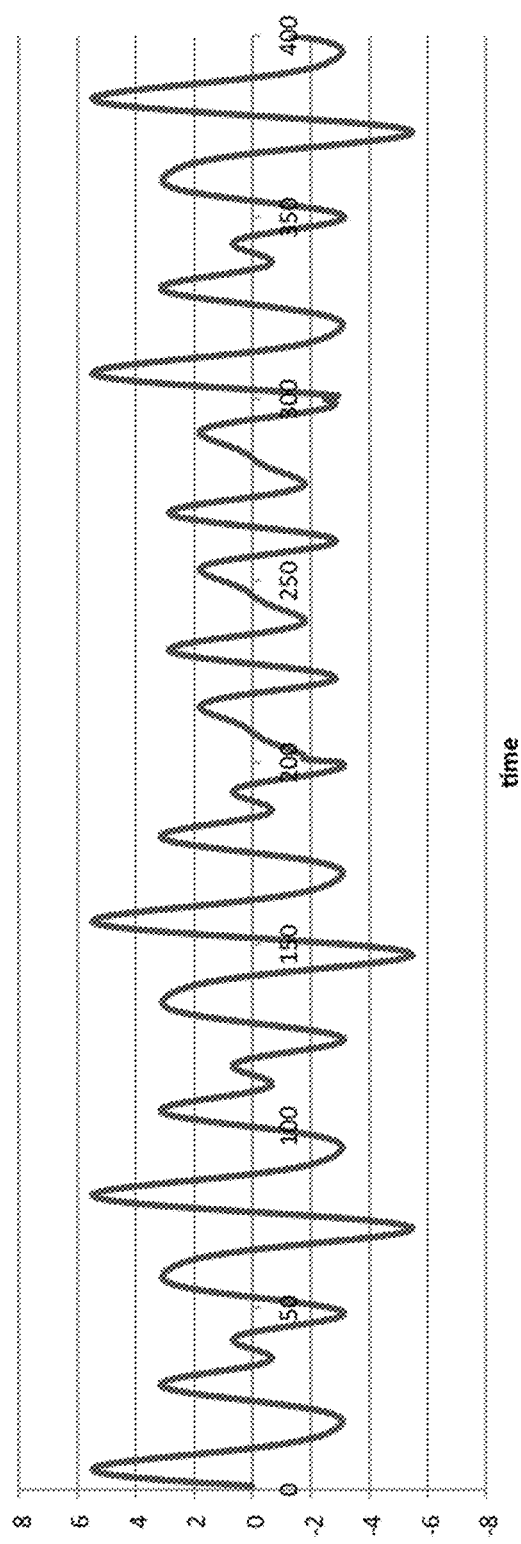
FIG. 5 shows a sensor signal with 2 "modes", as may be utilized in some embodiments.

In some embodiments, an external signal will be indicative of a fundamental change in sensor dynamics. This may result in a bi-modal (or higher order) split in the behavior of the sensor. This is illustrated in FIG. 5; in this example, a vibration sensor is recording as the engine is being driven in the forward direction between times 0 and 200, then in reverse between times 200 and 300, and forward again thereafter. If a single model were to be trained during this entire time period it would likely perform poorly because of the differences in the signal between these two modes, and would therefore result in too many false positives in the application phase.

In some embodiments, the solution is to train two separate models, one for the forward condition, and one for the reverse condition. Then, in the application phase, only one model at a time is chosen, depending on the mode of operation. In this manner, only errors that arise with respect to the model in the given mode will result in anomalies, as desired.

In some embodiments, the signal will be bi-modal without a clear indication that the mode has switched. For example, it may not be known that the engine switched from forward to reverse, or switched into a different mode spontaneously. In these cases, it may be necessary to separate out the data in a pre-processing step, and then apply the model-generation algorithm to each separated stream. In some embodiments, this can be accomplished by a search through the frequency space of the signal, with a fixed window size but varying offset. For example, assuming a window size of 50 time steps, and an offset of 25, Fourier analysis of the signal in FIG. 5 will reveal a fundamentally different frequency signature of the data in steps 200 to 300 than the rest of the data. This data can then be separated and trained accordingly. In another, but similar embodiment, a wavelet decomposition of successive sections of the data is performed. If the coefficients of the wavelet transformation differ significantly for a section, then the device is considered to be in a separate mode, and a separate model will be used for this data.

Anomalies, from a uni-modal model or otherwise, and indicating outliers, deviation from expectation, and/or drift, are fundamentally problematic in that they may or may not be indicative of a deeper problem or other item of interest. They may be mere statistical deviations from the mean, or they may be truly indicative of a change in circumstance, but one that is not necessarily relevant to items of interest such as device failure, or in a large industrial context, throughput or other more abstract quantities such as Return on Investment (ROI). Thus, the generation of an anomalies and the reporting of such, often at considerable cost, is an exercise that is untethered from variables of interest. In what follows, a methodology will be advanced that ties anomalies to these variables, and potentially justifies both the effort in creating them, as well as the attention that needs to be paid to their accurate generation.

The first step in this process is the generation of the so-called anomaly stream. This is meant to parallel the sensor stream itself, and as will be shown, to leverage any manipulation on that stream in making predictions including the pre-processing stages of both feature engineering and feature filtering, and the implicit manipulation of streams by any time-series training algorithm. The anomaly stream then becomes just another input stream to a data table.

In some embodiments, the anomaly stream will have the same temporal resolution as the original sensor stream; in others the resolution will be less because data is aggregated over multiple time steps in order to produce a single value; this will be the case, for example, when distributions of PVAs are being compared to normalcy rather than single values. Both of these cases are illustrated in the table below; the variable of interest here is a Boolean indicating whether or not the device has failed at any given time step. In this table, an indication of the degree to which an outlier is an anomaly is given at every time step, while the predictive anomalies are generated every 2 time steps.

|  | time | | | | |
| --- | --- | --- | --- | --- | --- |
|  | 1 | 2 | 3 | 4 | 5 |
| failure? | $f_1$ | $f_2$ | $f_3$ | $f_4$ | $f_5$ |
| outlier anomaly value | $a_1$ | $a_2$ | $a_3$ | $a_4$ | $a_5$ |
| predictive anomaly value | — | $p_1$ | — | $p_2$ | — |

In some cases, an expert will be able to determine the rules or algorithm for producing the variable of interest from the anomaly streams themselves. For example, an expert might declare that whenever there is an anomalous deviation of a certain magnitude on a temperature sensor below threshold, then the device will "seize up" and cease to function. In these cases, the task of the expert is to formalize this knowledge, and to normalize it with respect to the generated anomaly stream(s).

In another embodiment, expert knowledge is either insufficient to delineate the precise conditions under which the streams produce differing values in the variable of interest, or the performance of the expert-created model will be worse than a machine-generated one, especially when numerous sensors and their associated anomalies are taken into account.

In another embodiment, a master table of streaming data can be produced that includes all of the raw sensor data on a device, all associated anomaly streams, and the values of variable of interest itself. This is illustrated in the table below; shown are two sensors and associated anomaly streams and drift streams in a hypothetical plurality of sensors for this device.

|  | time | | | | |
| --- | --- | --- | --- | --- | --- |
|  | 1 | 2 | 3 | 4 | 5 |
| variable of interest | $v_1$ | $v_2$ | $v_3$ | $v_4$ | $v_5$ |
| sensor 1 raw values | $s_1$ | $s_2$ | $s_3$ | $s_4$ | $s_5$ |
| sensor 1 outlier anomaly stream | $s1a_1$ | $s1a_2$ | $s1a_3$ | $s1a_4$ | $s1a_5$ |
| sensor 1 predictive anomaly stream | $s1p_1$ | $s1p_2$ | $s1p_3$ | $s1p_4$ | $s1p_5$ |
| sensor 1 drift stream | $s1d_1$ | $s1d_2$ | $s1d_3$ | $s1d_4$ | $s1d_5$ |
| sensor 2 outlier anomaly stream | $s2a_1$ | $s2a_2$ | $s2a_3$ | $s2a_4$ | $s2a_5$ |
| sensor 2 predictive anomaly stream | $s2p_1$ | $s2p_2$ | $s2p_3$ | $s2p_4$ | $s2p_5$ |
| sensor 2 drift anomaly stream | $s2d_1$ | $s2d_2$ | $s2d_3$ | $s2d_4$ | $s2d_5$ |
| ... | ... | ... | ... | ... | ... |

Variables of interest in the master table will result in differing embodiments, and include but are not limited to mean time to failure, probability of failure in a given period, efficiency of the device by an appropriate measure, downtime by device, ROI by device, and the like.

Once a master table has been constructed in this manner, the situation becomes a standard time-series problem, in that the goal is to produce a model that predicts the variable of interest at time t, $v_t$, by the prior values of v, as well as all the other values in the table prior to time t. In other words, the anomaly streams can be in effect treated as if they are sensors themselves, and the generated data is treated no differently than that generated by actual sensors.

Note, however, that this is a different and additional prediction problem than that presented above in the context of predictive anomalies, but one that may use similar conventional time-series predictive algorithms such as Autoregressive Integrated Moving Average (ARIMA) and Long Short Term Memory (LSTM). In summary, variables of interest can be predicted by a model that is formed in two discrete steps. In the first, anomaly streams are produced for each sensor in a device, with predictive anomalies of necessity making use of a time-series predictive algorithm. Once the anomaly streams are assembled in a master table of such, another application of a times-series algorithm can be used to produce a model of a variable of interest.

One question that naturally arises in the context of the master table and by extension the purpose of this patent is the following: given that the anomaly streams are derived from the sensor streams themselves, how can they add predictive power if they do not contain additional information to these streams? At the broadest level, the answer to this question is that the anomaly streams, by directly exposing independent variables of interest, make it easier for the learner to spot, in some circumstances, the appropriate drivers of the variable of interest, especially when there are multiple such drivers.

Consider, for example, a physician reasoning about the likelihood of heart disease. While it is possible to reason from raw statistics, it is more likely that he or she will reason from categorical deviations from average, such as normal, overweight, or obese BMI, low, medium or high degree of exercise, cholesterol level normal, dangerous, or very dangerous, etc. The raw data itself contains an unnecessary level of precision, and one that may obscure combinatoric effects.

Figure 6:
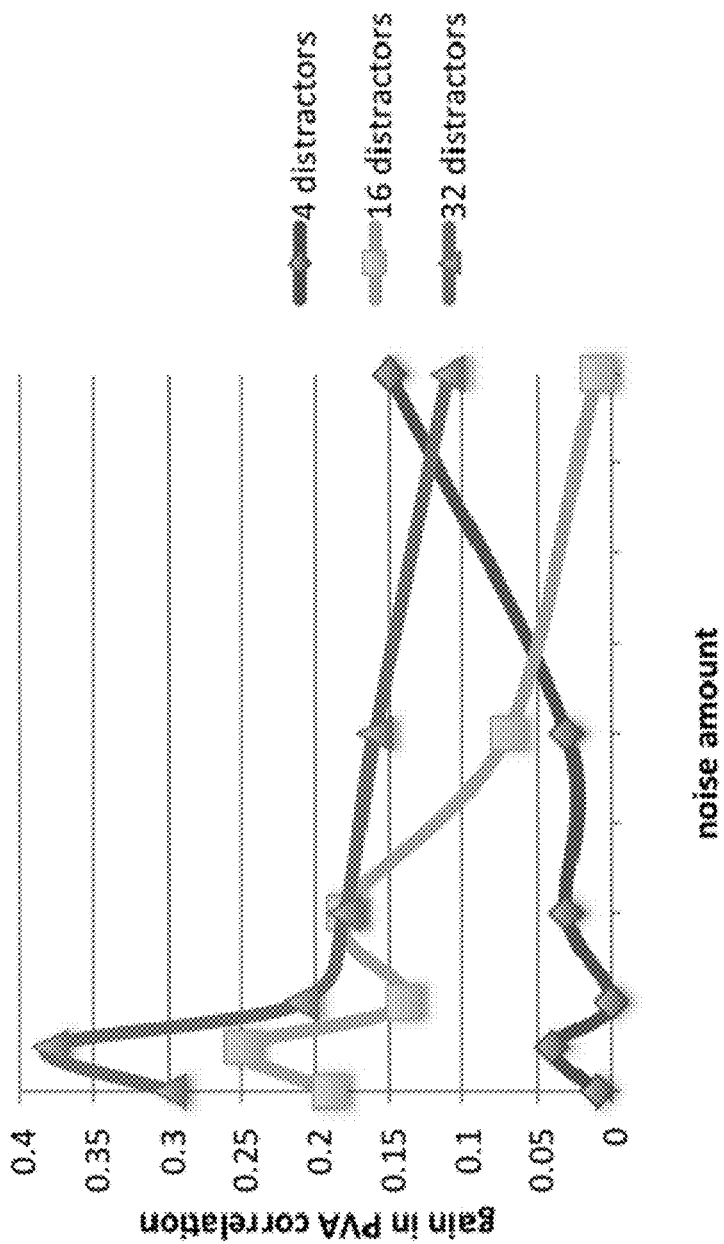
FIG. 6 illustrates the improvement in predictive accuracy based on including an anomaly stream as a function of noise and distractors in a simulated example, according to some embodiments.

As a working example of the greater predictive power of including an anomaly stream, FIG. 6 presents the results of simple but representative simulation. For this simulation, a neural network was trained with and without an anomaly detector on a task in which the probability of failure was assumed to be proportional to the degree to which a sensor value was anomalous in the outlier sense. The graph shows the difference in PVA Pearson correlation between anomaly detector present condition and the condition in which it was absent as a function of equally distributed noise and distracting features, on a withheld set of validation data. The noise was added to the probability value directly; thus, the higher this value, the less likely that the probability of failure was proportional to the degree of anomaly. Distracting features were extra, random features not correlated with probability of failure.

In general, the adding such features makes it relatively harder for the network to learn the task in the absence of an anomaly detector. The relationship between the amount of noise and difference in PVA correlation is more complex, as the graph shows. Nonetheless, there is a clear increase in learning ability when an anomaly detector is present, and if the failure is due to this anomaly, even though the same information is present implicitly in the raw sensor data. The presence of the anomaly detector makes it easier to learn the relationship between the anomaly and the variable of interest in the presence of noise and/or distracting features.

In some embodiments, rows in the table shown above are replaced or augmented by a transformed version of the row. For example, in a common embodiment, a raw anomaly stream can be augmented or replaced by a one that takes a running average of this stream. The purpose of the running average is to remove the occasional anomaly that arises by chance, and only present to the learner anomalies that are relatively large or by ones that persist over time. Recall that both outlier and predictive anomalies are formed by thresholding with respect to some deviation level from normalcy; whatever level is chosen, there will be some cases that occur by noise, and are not reflective of a either a true deviation from normalcy or an underlying problem.

In some embodiments, the additional anomaly streams will present combined with variable lookbacks and other feature transformations will result in a large number of effective variables to the predictive algorithm. Rather than presenting all of this data to the learner, which will be costly with respect to training time, as well as possibly leading to overfitting the model to the data, the additional streams or modifications thereof can be filtered by a number of techniques that remove those unlikely to add predictive power to the eventual model. These include but are not limited to filtering on the basis of mutual information with respect to the variable of interest, filtering out redundant streams i.e. those that contain little or no information relative to another stream, or principle component analysis (PCA).

In some embodiments, the amount of time to look back in the streams, whether they represent raw data, or anomaly-generated data, is determined by a separate pre-processing algorithm. While not strictly necessary, this step ensures that for each stream, only the optimal or near optimal amount of data is present. If the lookback is too short, then information predictive of the variable of interest may be missing; if too long, extraneous data is present, lowering the predictive accuracy of the eventual model and its ability to generalize to new situations.

In one embodiment, a linear search over the lookback window is performed such that the size of this window is determined by the maximal mutual information with respect to the variable of interest. In another embodiment, a more directed binary search carries out the same task. Such a search implicitly assumes that there is a single maximum of information as a function of window size; otherwise it may find a local minimum of such.

In some embodiments, it may be useful to generate a collective anomaly measure over a plurality of individual such measures within a device. This measure may be of interest in itself, or, as with the anomaly streams themselves, may be a better predictor of a variable of interest. For example, in an engine, outlier anomalies and/or predictive anomalies may be combined to produce a single anomaly measure for the engine as a whole. This measure, in turn, may have better predictive insight into a variable of interest such as operating efficiency than the raw data streams, or any individual anomaly stream.

In one embodiment, multiple anomaly measures can be combined by combining the probability $p_i$ of each measure i via Fisher's method. This method assumes approximate independence between the measures, which may not be the case if the underlying cause of the anomalies is the same. Extensions to Fisher's method such as Brown's method may be applied in this case. Another possibility is to associate a Z-score with each measure, and use Stouffer's Z-score method to compute a general score, which then may be optionally turned into a probability that a global anomaly is present. Stouffer's method can also easily be augmented by weights that favor certain anomalies over others. Regardless of method, the end result will be a new, "global anomaly stream" (also referred to herein as a "system anomaly stream") for direct presentation, or as an input to a predictive algorithm for a variable of interest.

In the most general embodiment, anomalies from single streams of any type, or collective anomalies of any type, are formed over a plurality of devices each comprising a plurality of sensors in a common environment with the goal of forming better predictions with respect to that environment over global variables of interest. As an example, consider the factory floor. This environment will be characterized by a number of machines (i.e., devices), each with a number of sensors. In addition to providing information with respect to variables of interest within a device, such sensors and their respective anomaly streams may be indicative of factory-wide variables of interest including but not limited to downtime, operating efficiency, profitability per unit time, and throughput.

In order to make such predictions, a "global" master table may be constructed along the lines of the simplified one below. At the top, as before, is the variable of interest stream. Just below on the second line is the global anomaly stream, formed by statistical combination of all of the anomaly streams in a given column. Then each device is listed, comprising a global anomaly measure for the device as a whole, and each of the sensors within the device and their respective anomaly streams. In general, many such devices will be present, although not all sensors in all devices or their anomaly streams will necessarily contribute to the predictive accuracy of the eventual model of the variable of interest. Thus, as before, a separate pre-processing step filtering out of uninformative streams may not only be warranted, but also recommended because of the potentially large numbers of such streams.

|  | device | time 1 | 2 | 3 | 4 | 5 |
|---|---|---|---|---|---|---|
| global variable of interest | factory | $v_1$ | $v_2$ | $v_3$ | $v_4$ | $v_5$ |
| global anomaly over all devices | factory | $a_1$ | $a_2$ | $a_3$ | $a_4$ | $a_5$ |
| device1 global anomaly | dev1 | $d_1$ | $d_2$ | $d_3$ | $d_4$ | $d_5$ |
| sensor 1 raw values | dev1 | $s_1$ | $s_2$ | $s_3$ | $s_4$ | $s_5$ |
| sensor 1 outlier anomaly stream | dev1 | $s1a_1$ | $s1a_2$ | $s1a_3$ | $s1a_4$ | $s1a_5$ |
| sensor 1 predictive anomaly stream | dev1 | $s1p_1$ | $s1p_2$ | $s1p_3$ | $s1p_4$ | $s1p_5$ |
| sensor 1 drift stream | dev1 | $s1d_1$ | $s1d_2$ | $s1d_3$ | $s1d_4$ | $s1d_5$ |
| sensor 2 outlier anomaly stream | dev1 | $S2a_1$ | $s2a_2$ | $s2a_3$ | $s2a_4$ | $s2a_5$ |
| sensor 2 predictive anomaly stream | dev1 | $s2p_1$ | $s2p_2$ | $s2p_3$ | $s2p_4$ | $s2p_5$ |
| sensor 2 drift anomaly stream | dev1 | $s2d_1$ | $s2d_2$ | $s2d_3$ | $s2d_4$ | $s2d_5$ |
| ... | | ... | ... | ... | ... | ... |
| device2 global anomaly | dev2 | $d_1$ | $d_2$ | $d_3$ | $d_4$ | $d_5$ |
| sensor 1 raw values | dev2 | $s_1$ | $s_2$ | $s_3$ | $s_4$ | $s_5$ |
| sensor 1 outlier anomaly stream | dev2 | $s1a_1$ | $s1a_2$ | $s1a_3$ | $s1a_4$ | $s1a_5$ |
| sensor 1 predictive anomaly stream | dev2 | $s1p_1$ | $s1p_2$ | $s1p_3$ | $s1p_4$ | $s1p_5$ |
| sensor 1 drift stream | dev2 | $s1d_1$ | $s1d_2$ | $s1d_3$ | $s1d_4$ | $s1d_5$ |
| sensor 2 outlier anomaly stream | dev2 | $s2a_1$ | $s2a_2$ | $s2a_3$ | $s2a_4$ | $s2a_5$ |
| sensor 2 predictive anomaly stream | dev2 | $s2p_1$ | $s2p_2$ | $s2p_3$ | $s2p_4$ | $s2p_5$ |
| sensor 2 drift anomaly stream | dev2 | $s2d_1$ | $s2d_2$ | $s2d_3$ | $s2d_4$ | $s2d_5$ |
| ... | | ... | ... | ... | ... | ... |
| other devices | ... | ... | ... | ... | ... | ... |

In some embodiments, some or all of above actions can be carried out in parallel hardware. In the case of forming predictive anomalies, parallel versions of time-series algorithms such as a conventional LSTM algorithm. Likewise, the formation of a model of a variable of interest can also benefit from parallel hardware if the appropriate learning algorithm is chosen. With respect to the formation of multiple anomalies, either within a device, or within a collection of devices, each such process is completely independent of the other, and thus can be parallelized easily by sending each set of data or table associated with the anomaly stream to a separate processor. Finally, some aspects of the feature engineering, either in the formation of predictive anomalies, or in the formation of a model of a variable of interest may be parallelized. For example, the search for an optimal lookback of prior data in each stream can be accomplished over multiple processors, with each handling a subset of lookback values.

Figure 7:
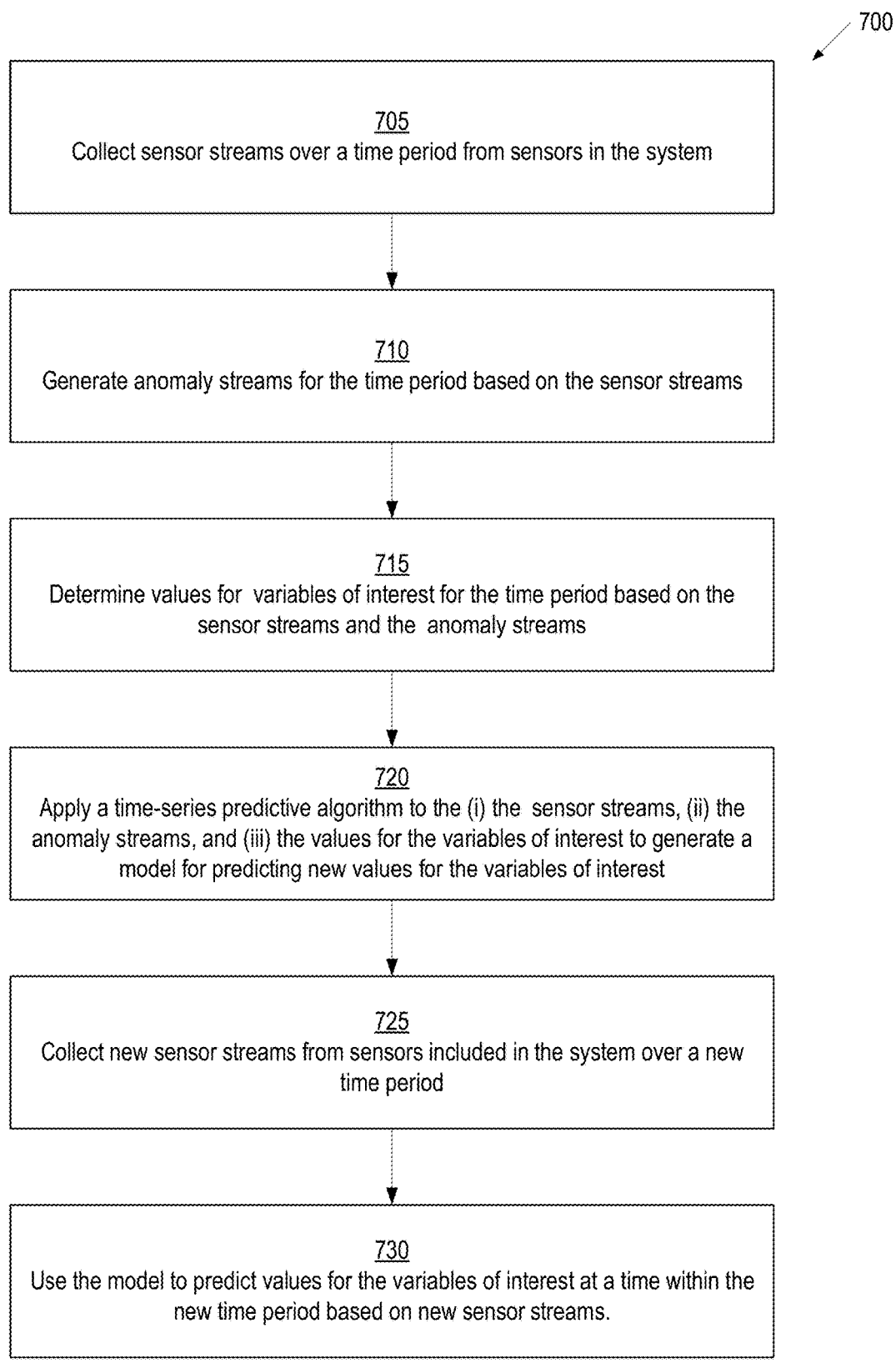
FIG. 7 illustrates a method for predicting one or more variables of interest related to a system, according to some embodiments of the present invention.

FIG. 7 illustrates a method 700 for predicting one or more variables of interest related to a system using the techniques discussed above, according to some embodiments of the present invention. The system analyzed with the method 700 may include one or more devices. For example, in the context of a factory, the system may include a plurality of machines. Each device included in the system houses one or more sensors which generate sensor data.

The method 700 may be performed by any computing system known in the art; however specialized computing systems may be used in some embodiments to provide enhanced processing capabilities. For example, in some embodiments, the computing system is a parallel processing platform (see FIG. 10) that allows parallelization of various computational tasks involved with performing the method 700.

Starting at step 705 of FIG. 7, the computing system collects one or more sensor streams over a time period from one or more sensors in the system. A sensor stream is a stream of values generated by the sensor at the regular or close to regular intervals. As described in further detail below, later steps of the process 700 will use a fixed number of such readings to train the predictive model to predict the next sensor value, and to collect a sample of error values to estimate error distribution. Various techniques generally known in the art may be used to collect sensor values from the sensors. For example, in some embodiments, each sensor includes a transmitter that allows the sensor to push sensor values to the computing system performing the method 700. These values may be pushed, for example, as they are generated or at regular intervals. In other embodiments, the computing system performing the method 700 may periodically retrieve sensor data to the computing system. The method used for collecting sensor data will vary depending on the type of sensors being analyzed and other aspects of the computing architecture in which the sensors operate. For example, in a factory setting, the sensors and the computing system communicate may communicated with a local wired or wireless network. In a more distributed setting, where sensors are geographically dispersed, the Internet may be used for communications.

Once the sensor streams are collected, they are used at step 710 to generate one or more anomaly streams for the time period. It should be noted that the anomaly stream may be generated concurrently with collection of the sensor stream. As a sensor value is collected, it can be compared to a predicted value to generate an error value. Statistical tests can be applied to estimate the probability of the error (or small sample of errors) coming from the base distribution. If such probability is low, one can conclude that state of system changed in such a way that model no longer capable of describing it and anomaly is assumed. The stream of these decisions is the anomaly stream. Various types of anomaly streams may be generated at step 710 including, without limitation, outlier streams and streams that indicates drifts of the sensors values from an expected distribution of sensor values.

Once the anomaly streams are generated, they are used at step 715 with the sensor streams to determine values for one or more variables of interest for the time period. Example variables of interest include, without limitation, downtime, operating efficiency, throughput, and profitability. The variables of interest may independent of one another or, in some instances, two or more variables of interest may have a dependent relationship. In some embodiments, a human expert analyzes sensor streams and anomaly streams generated over a time period to construct a set of rules deriving the values of the variable of interest. Once these rules are constructed, values of the variable of interest can be automatically determined as new streams are received. In other embodiments, a time-series inductive model may be employed to derive values of the variable of interest.

Next, at step 720, the computing system applies a time-series predictive algorithm to the sensor streams, the anomaly streams, and the values for the variables of interest to generate a model for predicting new values for the variables of interest. In some embodiments, the model is a machine learning model, while in other embodiments different types of predictive models may be used at step 720. As noted above, in some embodiments, the sensor streams, the anomaly streams, and the values for the variables of interest are compiled in a table and table-based operations are used in predicting the new values for the variables of interest. However, the use of a table is only one example of how the processing may occur at step 720. In other embodiments, different types of tables may be used or other, non-table data structures may be employed.

Continuing with reference to FIG. 7, at step 725, the computing system collects new sensor streams from one or more sensors included in the system over a new time period. The techniques for collection of the data at step 725 are the same as described above with reference to step 705. Then, at step 730, the computing system uses the model developed at step 720 to predict values for the variables of interest at a time within the new time period based on the new sensor streams. In some embodiments, a new anomaly stream is generated based on the sensor stream collected at step 725. This new anomaly stream can then be used as an additional input to the model as the prediction is generated at step 730.

Figure 8:
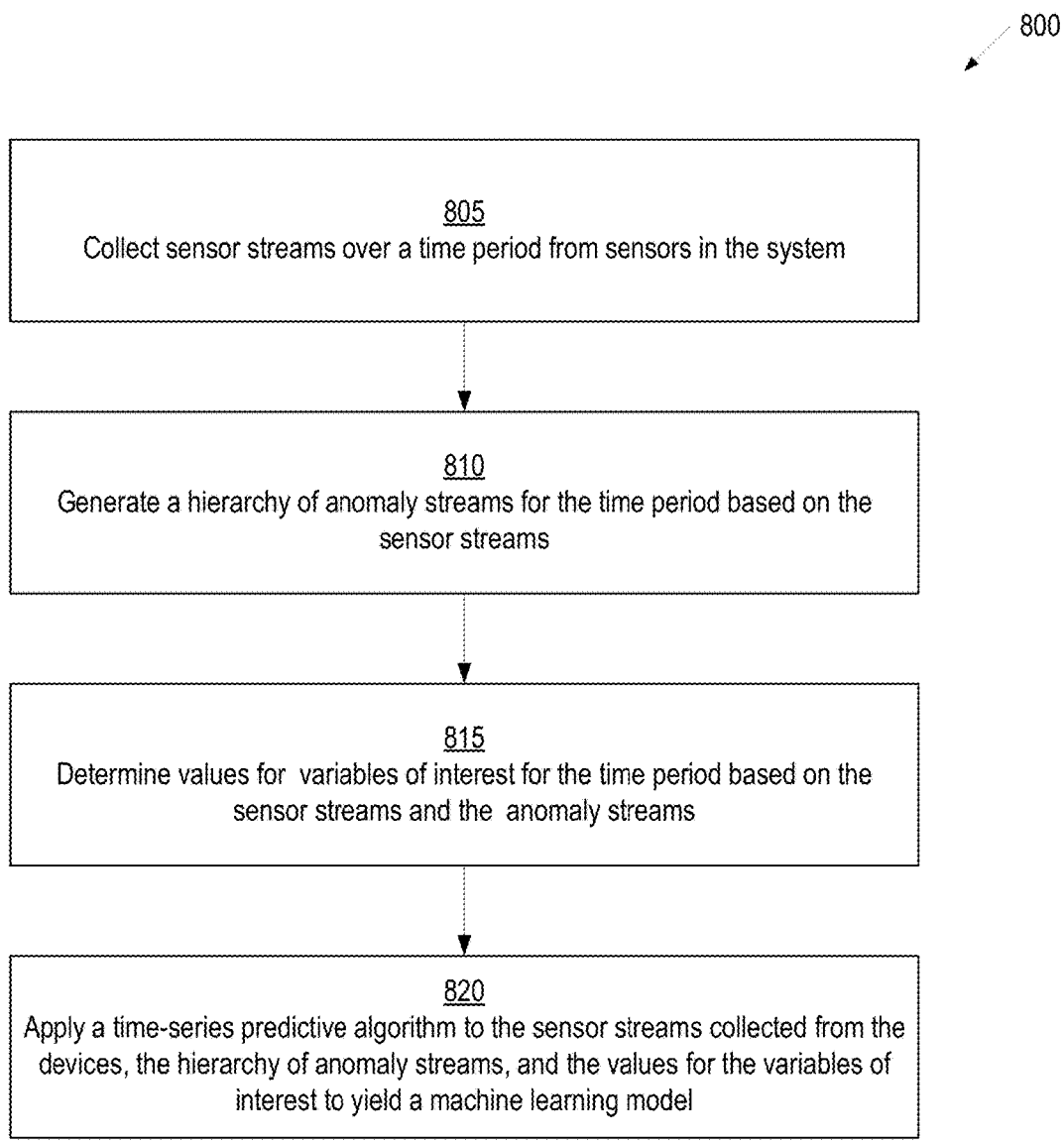
FIG. 8 illustrates an alternative method 800 for predicting one or more variables of interest related to a system comprising a plurality of devices, according to some embodiments.

FIG. 8 illustrates an alternative method 800 for predicting one or more variables of interest related to a system comprising a plurality of devices, according to some embodiments. Starting at step 805, one or more sensor streams are collected over a time period from each device included in the system. Example techniques for data collection are described above with respect to step 705 of FIG. 7.

Next, at step 810, the system executing the method 800 generates a hierarchy of anomaly streams. The term "hierarchy of anomaly streams" refers to a plurality of anomaly streams organized, either conceptually or structurally, in a hierarchy from the system (e.g., factory or building) level down to the device level and, in some embodiments, down further to lower levels (e.g., device components). The relationship between different levels of the hierarchy may be determined based on, for example, the source of each anomaly stream or different fields present in each anomaly stream. A device level anomaly stream may be constructed statistically or otherwise from the anomaly streams in the device itself. The system anomaly stream may be constructed from the collection of device-level anomalies (and possibly finer-grained sensor data). For example, in one embodiment, the system anomaly stream is generated by first determining a probability value for each of the anomalous sensor values in the device anomaly streams, and then combining the probability values using Fisher's method to generate the system anomaly stream. In other embodiments, the system anomaly stream is generated by calculating Z-score with each of the anomalous sensor values in the device anomaly streams. Then, Stouffer's Z-score method used to compute a general score based on Z-score calculated for each of the anomalous sensor values, and the general score is transformed into one or more probability values to generate the system anomaly stream.

Continuing with reference to FIG. 8, at step 815 values are determined for variables of interest for the time period based on the sensor streams collected from the devices and the hierarchy of anomaly streams. Next, at step 820 a time-series predictive algorithm (e.g., ARIMA) is applied to the sensor streams collected from the devices, the hierarchy of anomaly streams, and the values for the variables of interest. Application of the time-series predictive algorithm results in a machine learning model that may be used to predict new values for the variables of interest. This model can then be used to predict values for the variables of interest at a time within new time periods based on new sensor streams collected from the devices during those new time periods.

Figure 9:
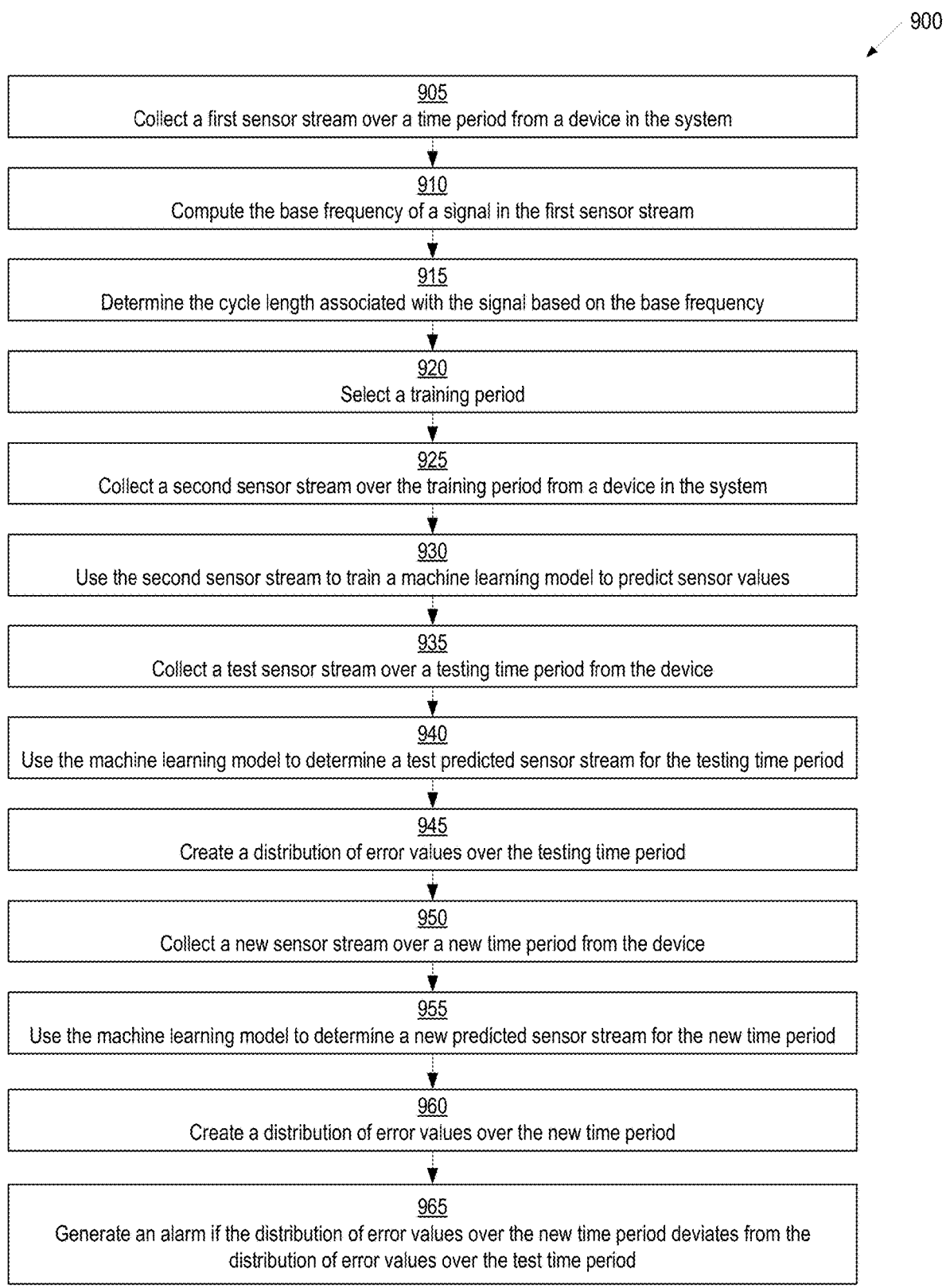
FIG. 9 shows another method for predicting one or more variables of interest related to a system comprising a plurality of devices, according to some embodiments.

FIG. 9 shows another method for predicting one or more variables of interest related to a system comprising a plurality of devices, according to some embodiments. Starting at step 905, a first sensor stream is collected over a time period from a device included in the system. A base frequency of a signal in the sensor stream is computed at step 910 using a Fast Fourier Transform (FFT) or similar technique and, at step 915, the cycle length associated with the signal is determined based on the base frequency. A training period is selected at step 920. In some embodiments, this training period is equal to the cycle length multiplied by a predetermined value. Thus, steps 910-920 may be understood as using the frequency of the signal to compute the a cycle length of the feature and amount of time needed to collect a desired number of cycles of data for training.

A second sensor stream is collected at step 925 over the training period from the device. The second sensor stream is used at step 930 to train a machine learning model to predict sensor values at future time periods. Then, a test sensor stream is collected at step 935 over a testing time period from the device. The machine learning model is used at step 940 to determine a test predicted sensor stream for the testing time period. A distribution of error values over the testing time period is created at step 945 by comparing the test sensor stream to the test predicted sensor stream. In other words, the machine is run for one or more cycles and errors between model predictions and actual outcomes are collected.

Steps 950-965 are performed during deployment of the machine learning model on a production system. At step 950, a new sensor stream is collected over a new time period from the device. The aforementioned machine learning model is used at step 955 to determine a new predicted sensor stream for the new time period. Next, a distribution of error values over the new time period is created at step 960 by comparing the new sensor stream to the new predicted sensor stream. In some embodiments, a technique such as KS test is used to verify that the two distributions came from the same random process.

Continuing with reference to FIG. 9, if the distribution of error values over the new time period deviates from the distribution of error values over the test time period, an alarm is generated at step 965. That is, if comparison test fails, one can claim with high degree of certainty that underlying process have changed. At that point, the system raises an alarm indicating the detection of an anomaly. Various techniques may be used for communicating the alarm to users. For example, in some embodiment, an alert message from is transmitted the computer executing the method 900 to a server computer that formats the alert into an email message that, in turn, is transmitted over a network to one or more user. The alert message may be transmitted between devices using any format generally known in the art. For example, in one embodiment, the alert message is transmitted in Extensible Markup Language (XML) and the aforementioned server includes software that enables it to extract the relevant information from the XML and format it into an email message. It should be noted that, in some embodiments, the functionality of the server computer can be incorporated into the computer executing the method 900 such that it is not necessary to use two separate devices. As a second example, the computer executing the method 900 transmits instructions for displaying the alert message to a computer monitor or other display. As an alternative to displaying the alert message on a computer monitor, in some embodiments, a different visual mechanism may be used (e.g., flashing light). Other, non-visual alert mechanisms may be used as well (e.g., buzzers or other auditory alarms).

FIG. 10 provides an example of a parallel processing platform 1000 that may be utilized to implement the machine learning models and other aspects of the various sensor processing methods discussed herein. This platform 1000 may be used in embodiments of the present invention where NVIDIA CUDA™ (or a similar parallel computing platform) is used. The architecture includes a host computing unit ("host") 1005 and a graphics processing unit (GPU) device ("device") 1010 connected via a bus 1015 (e.g., a PCIe bus). The host 1005 includes the central processing unit, or "CPU" (not shown in FIG. 10), and host memory 1025 accessible to the CPU. The device 1010 includes the graphics processing unit (GPU) and its associated memory 1020, referred to herein as device memory. The device memory 1020 may include various types of memory, each optimized for different memory usages. For example, in some embodiments, the device memory includes global memory, constant memory, and texture memory.

Parallel portions of a big data platform and/or big simulation platform may be executed on the platform 1000 as "device kernels" or simply "kernels." A kernel comprises parameterized code configured to perform a particular function. The parallel computing platform is configured to execute these kernels in an optimal manner across the platform 1000 based on parameters, settings, and other selections provided by the user. Additionally, in some embodiments, the parallel computing platform may include additional functionality to allow for automatic processing of kernels in an optimal manner with minimal input provided by the user.

The processing required for each kernel is performed by a grid of thread blocks (described in greater detail below). Using concurrent kernel execution, streams, and synchronization with lightweight events, the platform 1000 of FIG. 10 (or similar architectures) may be used to parallelize portions of the model based operations performed in training or utilizing the smart editing processes discussed herein. For example, the parallel processing platform 1000 may be used to execute multiple instances of a machine learning model in parallel.

The device 1010 includes one or more thread blocks 1030 which represent the computation unit of the device 1010. The term thread block refers to a group of threads that can cooperate via shared memory and synchronize their execution to coordinate memory accesses. For example, in FIG. 10, threads 1040, 1045 and 1050 operate in thread block 1030 and access shared memory 1035. Depending on the parallel computing platform used, thread blocks may be organized in a grid structure. A computation or series of computations may then be mapped onto this grid. For example, in embodiments utilizing CUDA, computations may be mapped on one-, two-, or three-dimensional grids. Each grid contains multiple thread blocks, and each thread block contains multiple threads. For example, in FIG. 10, the thread blocks 1030 are organized in a two dimensional grid structure with m+1 rows and n+1 columns. Generally, threads in different thread blocks of the same grid cannot communicate or synchronize with each other. However, thread blocks in the same grid can run on the same multiprocessor within the GPU at the same time. The number of threads in each thread block may be limited by hardware or software constraints.

Continuing with reference to FIG. 10, registers 1055, 1060, and 1065 represent the fast memory available to thread block 1030. Each register is only accessible by a single thread. Thus, for example, register 1055 may only be accessed by thread 1040. Conversely, shared memory is allocated per thread block, so all threads in the block have access to the same shared memory. Thus, shared memory 1035 is designed to be accessed, in parallel, by each thread 1040, 1045, and 1050 in thread block 1030. Threads can access data in shared memory 1035 loaded from device memory 1020 by other threads within the same thread block (e.g., thread block 1030). The device memory 1020 is accessed by all blocks of the grid and may be implemented using, for example, Dynamic Random-Access Memory (DRAM).

Each thread can have one or more levels of memory access. For example, in the platform 1000 of FIG. 10, each thread may have three levels of memory access. First, each thread 1040, 1045, 1050, can read and write to its corresponding registers 1055, 1060, and 1065. Registers provide the fastest memory access to threads because there are no synchronization issues and the register is generally located close to a multiprocessor executing the thread. Second, each thread 1040, 1045, 1050 in thread block 1030, may read and write data to the shared memory 1035 corresponding to that block 1030. Generally, the time required for a thread to access shared memory exceeds that of register access due to the need to synchronize access among all the threads in the thread block. However, like the registers in the thread block, the shared memory is typically located close to the multiprocessor executing the threads. The third level of memory access allows all threads on the device 1010 to read and/or write to the device memory. Device memory requires the longest time to access because access must be synchronized across the thread blocks operating on the device.

The embodiments of the present disclosure may be implemented with any combination of hardware and software. For example, aside from parallel processing architecture presented in FIG. 10, standard computing platforms (e.g., servers, desktop computer, etc.) may be specially configured to perform the techniques discussed herein. In addition, the embodiments of the present disclosure may be included in an article of manufacture (e.g., one or more computer program products) having, for example, computer-readable, non-transitory media. The media may have embodied therein computer readable program code for providing and facilitating the mechanisms of the embodiments of the present disclosure. The article of manufacture can be included as part of a computer system or sold separately.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

An executable application, as used herein, comprises code or machine readable instructions for conditioning the processor to implement predetermined functions, such as those of an operating system, a context data acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

A graphical user interface (GUI), as used herein, comprises one or more display images, generated by a display processor and enabling user interaction with a processor or other device and associated data acquisition and processing functions. The GUI also includes an executable procedure or executable application. The executable procedure or executable application conditions the display processor to generate signals representing the GUI display images. These signals are supplied to a display device which displays the image for viewing by the user. The processor, under control of an executable procedure or executable application, manipulates the GUI display images in response to signals received from the input devices. In this way, the user may interact with the display image using the input devices, enabling user interaction with the processor or other device.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f) unless the element is expressly recited using the phrase "means for."

We claim:
1. A method for predicting one or more variables of interest related to a system, the method comprising:
    collecting one or more sensor streams over a time period from one or more sensors in the system;
    generating one or more anomaly streams for the time period based on the one or more sensor streams;
    determining values for one or more variables of interest for the time period based on the one or more sensor streams and the one or more anomaly streams;
    applying a time-series predictive algorithm to the (i) the one or more sensor streams, (ii) the one or more anomaly streams, and (iii) the values for the one or more variables of interest to generate a model for predicting new values for the variables of interest;
    collecting one or more new sensor streams from one or more sensors included in the system over a new time period; and
    using the model to predict values for the one or more variables of interest at a time within the new time period based on the one or more new sensor streams.

2. The method of claim 1, wherein the system comprises one or more devices.

3. The method of claim 1, wherein the one or more anomaly streams are generated by applying a predictive model to each sensor value in the one or more sensor streams to identify anomalous sensor values sensor values.

4. The method of claim 3, wherein the predictive model is trained using an algorithm that deconstructs the one or more sensor streams on a basis of one or more transforms of the one or more sensor streams within fixed windows and the one or more sensor streams are generated based on the basis of one or more transforms.

5. The method of claim 4, wherein the basis of one or more transforms comprises a basis of wavelet transforms.

6. The method of claim 4, wherein the basis of one or more transforms comprises a basis of Fourier transforms.

7. The method of claim 3, wherein the predictive model identifies the anomalous sensor values sensor values by:
determining a trend line associated with a subset of the one or more sensor streams over a lookback period;
identifying sensor values in the subset as anomalous if the slope of the trend line exceeds a predetermined threshold.

8. The method of claim 1, wherein the one or more anomaly streams comprise (a) a stream of outlier sensor values and (b) time values indicating time of occurrence of the outlier sensor values.

9. The method of claim 1, wherein the one or more anomaly streams comprise a stream of drift sensor values indicating a change in distribution of the one or more sensor streams and corresponding time values indicating time of occurrence of the drift sensor values.

10. The method of claim 1, wherein the variables of interest comprise an indication of downtime of the system.

11. The method of claim 1, wherein the variables of interest comprise an indication of operating efficiency of the system.

12. The method of claim 1, wherein the variables of interest comprise an indication of throughput of the system.

13. The method of claim 1, wherein the variables of interest comprise an indication of one or more financial measures related to the system.

14. The method of claim 1, wherein the system comprises one or more devices and the variables of interest comprise mean time to failure of each device.

15. The method of claim 1, wherein the system comprises one or more devices and the variables of interest comprise a probability of failure of each device over a future time window.

16. The method of claim 1, further comprising:
generating a table comprising (i) the one or more sensor streams, (ii) the one or more anomaly streams, and (iii) the values for the variables of interest,
wherein the time-series predictive algorithm performs one or more table-based operations on the table to generate the model for predicting new values for the variables of interest.

17. A method for predicting one or more variables of interest related to a system comprising a plurality of devices, the method comprising:
collecting one or more sensor streams over a time period from each device included in the system;
generating a hierarchy of anomaly streams comprising (i) a device anomaly stream for each device included in the system identifying anomalous sensor values in the one or more sensor streams collected from the device and (ii) a system anomaly stream based on the device anomaly stream generated for each device included in the system;
determining values for one or more variables of interest for the time period based on (i) the one or more sensor streams collected from the devices and (ii) the hierarchy of anomaly streams;
applying a time-series predictive algorithm to the (i) the one or more sensor streams collected from the devices, (ii) the hierarchy of anomaly streams, and (iii) the values for the one or more variables of interest to generate a model for predicting new values for the variables of interest;
collecting one or more new sensor streams over a new time period from the plurality of devices included in the system; and
using the model to predict values for the one or more variables of interest at a time within the new time period based on the one or more new sensor streams.

18. The method of claim 17, wherein the system anomaly stream is generated by:
determining a probability value for each of the anomalous sensor values in the device anomaly streams; and
combining the probability values using Fisher's method to generate the system anomaly stream.

19. The method of claim 17, wherein the system anomaly stream is generated by:
calculating Z-score with each of the anomalous sensor values in the device anomaly streams; and
using Stouffer's Z-score method to compute a general score based on Z-score calculated for each of the anomalous sensor values; and
transforming the general score into one or more probability values to generate the system anomaly stream.

20. A method for predicting one or more variables of interest related to a system comprising a plurality of devices, the method comprising:
collecting a first sensor stream over a time period from a device included in the system;
computing a base frequency of a signal in the sensor stream;
determining a cycle length associated with the signal based on the base frequency;
selecting a training period equal to the cycle length multiplied by a predetermined value;
collecting a second sensor stream over the training period from the device;
using the second sensor stream to train a machine learning model to predict sensor values at future time periods;
collecting a test sensor stream over a testing time period from the device;
using the machine learning model to determine a test predicted sensor stream for the testing time period;
creating a distribution of error values over the testing time period by comparing the test sensor stream to the test predicted sensor stream;
collecting a new sensor stream over a new time period from the device;
using the machine learning model to determine a new predicted sensor stream for the new time period;
creating a distribution of error values over the new time period by comparing the new sensor stream to the new predicted sensor stream; and
if the distribution of error values over the new time period deviates from the distribution of error values over the test time period, generating an alarm.

* * * * *